(12) United States Patent
Couto et al.

(10) Patent No.: US 6,205,741 B1
(45) Date of Patent: Mar. 27, 2001

(54) PROTECTIVE BUMPER RAILING

(75) Inventors: Heraldo Couto, Lowell; Leonard J. Lapenta, Melrose, both of MA (US)

(73) Assignee: Boston Metal Products Corp., Medford, MA (US)

(*) Notice: Subject to any disclaimer, the term of this patent is extended or adjusted under 35 U.S.C. 154(b) by 0 days.

(21) Appl. No.: 09/187,281

(22) Filed: Nov. 5, 1998

Related U.S. Application Data

(63) Continuation of application No. 08/395,362, filed on Feb. 21, 1995, now Pat. No. 5,836,134.

(51) Int. Cl.$^7$ .................................................. E04F 19/02
(52) U.S. Cl. ................ 52/745.19; 52/288.1; 52/717.03; 52/717.05; 52/718.02
(58) Field of Search ............................ 52/287.1, 288.1, 52/716.1, 717.03, 717.04, 717.05, 718.02, 718.05, 716.3, 716.4, 745.19

(56) References Cited

U.S. PATENT DOCUMENTS

| | | | |
|---|---|---|---|
| 2,910,033 | * 10/1959 | Weisburg ...................... 52/718.02 X |
| 3,568,386 | * 3/1971 | Gossen ................................ 52/288.1 |
| 3,721,762 | * 3/1973 | Gooding ................................. 174/48 |
| 3,786,171 | * 1/1974 | Shira ..................................... 174/48 |
| 3,831,334 | * 8/1974 | Rutkowski et al. ................. 52/288.1 |
| 4,065,900 | * 1/1978 | Eggert ..................................... 52/476 |
| 4,204,376 | * 5/1980 | Calvert ........................... 52/288.1 X |
| 4,214,414 | * 7/1980 | Wendt ................................. 52/288.1 |
| 4,246,303 | * 1/1981 | Townsend ....................... 52/716.5 X |
| 4,308,704 | * 1/1982 | Lloyd ................................ 52/717.03 |
| 4,401,701 | * 8/1983 | Wolters ........................ 52/717.05 X |
| 4,803,592 | 2/1989 | Ashley . |
| 4,829,731 | * 5/1989 | Schluter ............................. 52/287.1 |
| 4,903,449 | * 2/1990 | Ellingson, Jr. ...................... 52/288.1 |
| 4,946,727 | * 8/1990 | Kessler ......................... 52/718.05 X |
| 5,001,877 | * 3/1991 | Edwards ............................ 52/288.1 |
| 5,014,486 | * 5/1991 | Mayle ......................... 52/717.03 X |
| 5,103,596 | 4/1992 | Fujii et al. . |
| 5,108,801 | * 4/1992 | Takahashi .............................. 428/31 |
| 5,110,650 | 5/1992 | Kessler . |
| 5,134,823 | * 8/1992 | Laughon .......................... 52/718.02 |
| 5,235,136 | * 8/1993 | Santucci et al. ................. 174/101 X |
| 5,283,096 | * 2/1994 | Greenberg et al. ............... 428/31 X |
| 5,836,134 | * 11/1998 | Couto et al. ...................... 52/718.02 |
| 6,050,037 | * 4/2000 | Gifford ........................... 52/288.1 X |

\* cited by examiner

Primary Examiner—Laura A. Callo
(74) Attorney, Agent, or Firm—Hale and Dorr LLP

(57) ABSTRACT

A unitary protective bumper rail for protecting a substrate comprises a resilient, longitudinally-extending mounting member having a substantially planar mounting surface for flush attachment to the substrate, a resilient, longitudinally-extending protective strip, and a hinged connector attached to the mounting member and protective strip along the adjacent longitudinally-extending sides thereof. The connector permits pivotal movement of the protective strip relative to the mounting member between a first position in which the protective strip overlies the mounting strip and a second position in which the protective strip is pivoted from the mounting member. The mounting member includes a latch mounted along the longitudinally-extending side thereof opposite the side thereof that is hingedly connected to the protective strip, and the protective strip includes a connector mounted along the longitudinally-extending the thereof opposite the side thereof that is hingedly connected to the mounting member. The latch and connector are arranged to engage each other when the protective strip and the mounting member are in the first position.

24 Claims, 2 Drawing Sheets

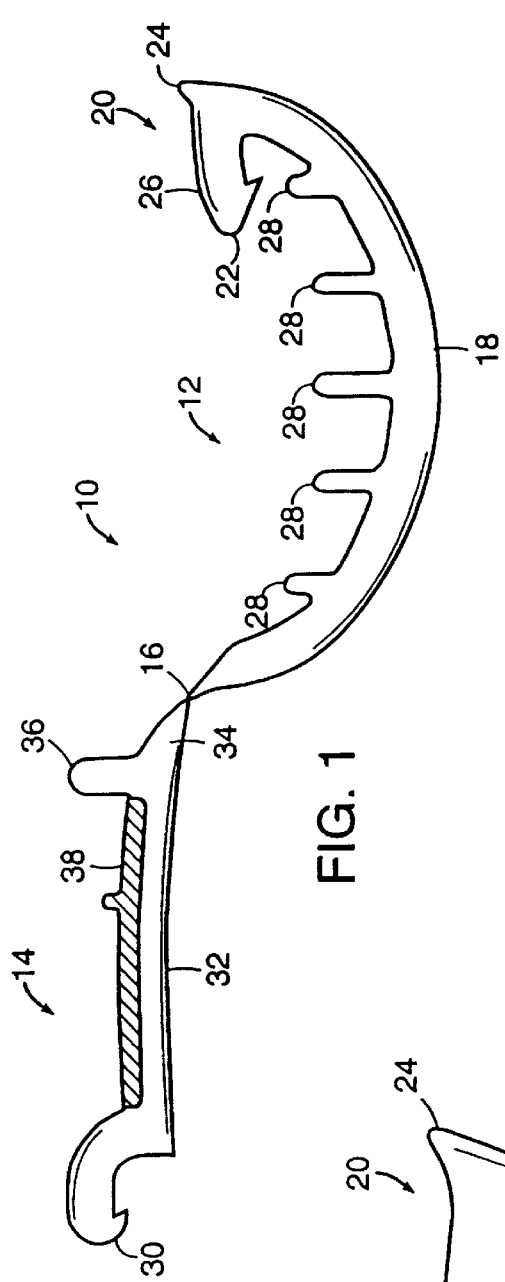
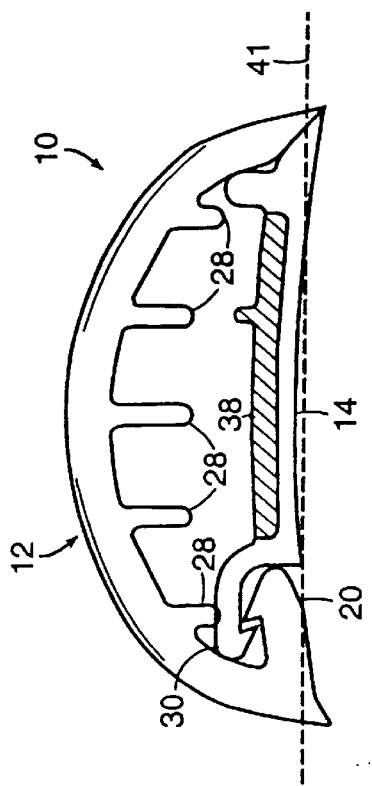
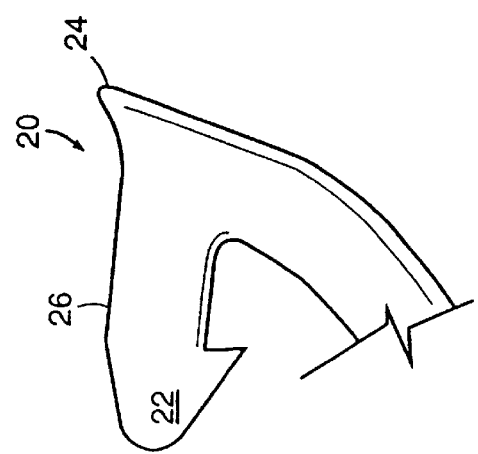

PROTECTIVE BUMPER RAILING

This application is a continuation of Ser. No. 08/395,362, now U.S. Pat. No. 5,836,134 filed Feb. 21, 1995.

FIELD OF INVENTION

This invention relates to protective bumper railings for protecting walls, display cases and furniture surfaces. In particular, this invention is directed to one piece, unitary bumpers having a resilient outer protective rail hingedly connected to a mounting portion

BACKGROUND

Protective strip assemblies which use resilient strip materials are well known in the art, as shown in U.S. Pat. Nos. 5,103,596, 5,110,650, 4,083,592 and 4,808,451 and the patents cited therein. Protective strip assemblies which incorporate coextrusion technology are also known in the art as illustrated in U.S. Pat. No, 5,2183,096. Such protective strip assemblies include a metal or plastic channel or other mounting member covered by a separate protective strip of resilient material, such as plastic or rubber. The mounting member is generally rectangular in cross-section and attaches to a substrate to be protected, such as drywall. The resilient rubber strip, in turn, attaches to the mounting member and partially or completely surrounds the mounting portion. The resilient strip typically engages the mounting member along the two longitudinal edges, e.g., the top and bottom edges, of the mounting member, through a variety of hook and latch combinations.

Such conventional bumper rail assemblies are commonly two piece assemblies, including a protective bumper and a separate mounting member. Such two piece designs suffer from a number of drawbacks. First, the two piece assembly is difficult to effectively install and, therefore, installation is quite time-consuming. The installer must first affix the mounting member to the surface to be protected, and then must fasten the protective bumper or covering to the mounting member. For effective installation and protection, the protective bumper must "lock" to the mounting member at two locations, generally along the top and bottom edges of the mounting member. Because of the multiple locking sites, the resilient bumpers must be manufactured with strict tolerances to ensure a properly snug fit to the mounting member. If tight tolerances are not maintained, the resilient bumper will either be too large and readily disengage from the mounting structure, or will be too small and may not be able to be installed at all or will readily disengage when impacted. Tight tolerances are particularly difficult to maintain over long length runs of resilient material. Thus, there is a high percentage of scrap due to the manufacturer's inability to maintain the required tolerances.

One piece protective bumper railings are also known in the art. They are less time-consuming to install, but are fabricated from rigid materials and overcome only some of the shortcomings of the more conventional two piece protective bumper assemblies. One such one piece railing, Acrovyn's FR-125 feature rail, is made from a high impact vinyl acrylic extrusion.

Neither the two piece protective bumper systems nor the one piece rigid bumper railings known in the prior art permit a flush fit of the protective portion of the bumper to the surface to be protected. When the prior art bumpers are installed, there is a gap between the surface to be protected, generally a wall, and the most rearward surface of the protective strip covering. This gap is a receptacle for crumbs the like and thus provides a breeding point for bacteria.

Prior art protective bumper systems also have poor radius capabilities. When the two piece bumper systems are employed on curved surfaces, special mounting members must be constructed or special processes used; and even so the resilient protective covering of a two piece bumper system tends to flatten out or collapse due to its flexibility when it is used on a curved surface. One piece prior art bumpers typically cannot be used on many curved surfaces at all; the bumper's rigid material makes radiused applications virtually impossible.

Prior art bumper systems also are cumbersome to ship. Although the resilient protective stirps featured in the prior art can be coiled and shipped in fairly long runs, the channel mounting members and one piece bumpers are rigid and must be cut and shipped in lengths. Because the rigid one piece bumpers are cut and shipped in relative short lengths, there are periodic, undesirable seams when the product is installed.

There is thus a need for a one piece bumper that can overcome these shortcomings of the prior art protective bumper railings.

OBJECTS

Principal objects of the present invention are to provide a unitary protective bumper railing which is easier to install, has a superior appearance, radius capability and resistance to shrinking and stretching, provides improved mating of the bumper portion and the mounting portion, is sanitary when installed, and which minimizes inventory requirements.

Other objects include providing such a one piece, unitary protective bumper railing which attaches directly to a substrate to be protected, has a flexible bumper strip portion hingedly connected to a mounting strip portion, includes internal ribs to maintain the exterior profile in radiused applications, has an insert to resist shrinking and stretching of the mounting portion, and provides for a tight flush fit between the outer edges of the railing and the substrate on which it is mounted.

Other objects, features, and advantages will appear from the following detailed description of preferred embodiments of the invention, taken together with the attached drawings.

DRAWINGS

FIG. 1 is a cross-sectional view of a preferred embodiment of the present invention in an open position.

FIG. 2 is a cross-sectional view of the embodiment of FIG. 1 in a closed position.

FIG. 3 is an enlarged cross-sectional view of portions of the embodiment of FIG. 1, illustrating certain features thereof in greater detail.

SUMMARY OF THE INVENTION

The present invention features a one piece, unitary resilient bumper rail including a mounting strip hingedly connected to a flexible protective strip. A latching member extends along one longitudinal edge of the mounting strip for engaging a mating member along one longitudinal edge of the protective strip. The hinged connection between the mounting and protective strips extends along the other longitudinal edge of each. At least one longitudinally-extending rib projects from the surface of each of the strips facing the other strip towards the adjacent or facing surface of the other strip. Upon impact, the ribs provide impact resistance by spreading the impact forces. The ribs also maintain the external contour and integrity of the protective covering when the bumper is used in a radiused application.

In some preferred embodiments, at least one of the mounting member and the latching member of the protective strip includes a resilient sealing rib which extends along a respective one of the longitudinal edges of the bumper rail. The resilient sealing rib projects rearwardly of the mounting strip when the locking members of the mounting and protective strips are engaged, thus engaging the substrate or which the railing is mounted and preventing stray material from accumulating between the substrate and the protective railing.

In other preferred embodiments, the mounting member includes a longitudinal stiffening insert located on the interior of the portion of the mounting intermediate the members' longitudinal edges. The insert may either be coextruded, and thereby an integral part of the unitary protective rail, or may be fabricated separately and placed into an appropriate recess in the interior of the mounting member. In the latter configuration, the insert is retained in place by inwardly extending retaining members formed integrally with and located at the interior of the mounting member.

DETAILED DESCRIPTION OF PREFERRED EMBODIMENTS

FIGS. 1–4 illustrate a one piece, unitary resilient protective bumper railing, generally designated 10. In FIG. 1, railing 10 is shown in an open position; in FIGS. 2 and 4 it is shown in a closed position. Railings such as railing 10 are typically made by continuous extrusion, and the extrusions are typically cut into, for example, 48 foot lengths. The cross-section of a railing is constant along the full length of the extrusion.

Figure 4:
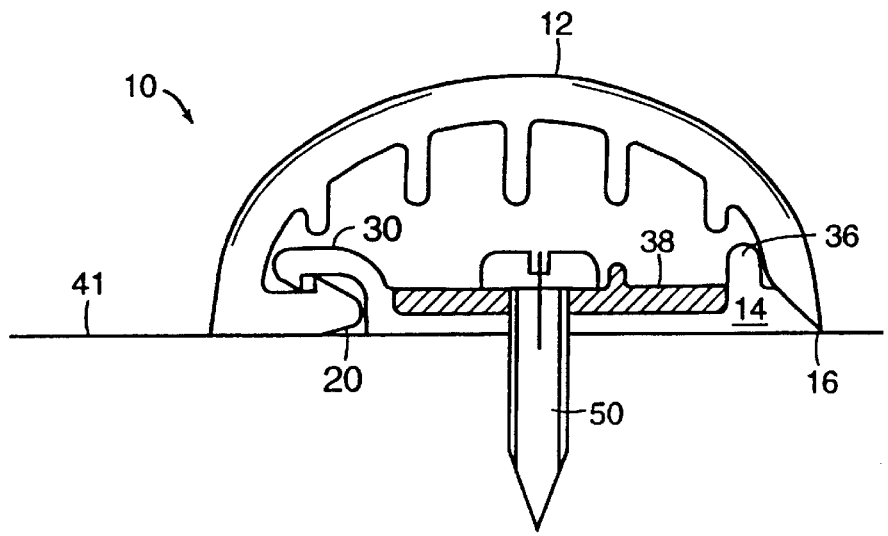
FIG. 4 is a sectional view of the resilient one piece protective bumper of FIG. 1 in a closed position and mounted on a wall.

As shown in FIGS. 1, 2 and 4, railing 10 includes a resilient protective strip 12 and a resilient mounting member 14 hingedly connected to each other by a hinged connector 16. Connector 16 permits the protective and mounting strips to be pivoted with respect to each other between the open position shown in FIG. 1 and the closed position shown in FIGS. 2 and 4.

As shown in FIGS. 1 and 2, the mounting strip 14 includes a generally planar central portion 32. A resilient hook 30 extends along one longitudinal edge of central portion 32, and hinged connector 16 extends along its opposite longitudinal edge. The outer (i.e., rear) surface 34 of central portion 32 is generally flat, or, as shown, is slightly inwardly concave in transverse cross-section. The slight overall transverse concavity is accentuated by providing that the portion of surface 34 along the hinged connector 16 projects slightly rearwardly of the generally flat rear surface, thus forming a resilient sealing rib 36. Accordingly, when the mounting member is installed on a wall 41 (as shown in FIG. 4), surface 34 faces and generally engages wall 41, and rib 36 is compressed tight against the wall to insure that no dirt, crumbs, etc. will fall behind the mounting strip.

Referring more particularly to FIG. 1, it will be appreciated that the railing 10 is installed on wall 41 when the railing is in its open position, and with the open portion of hook 30 facing the surface to which the protective bumper rail is attached. The hinged connector portion 16 allows an installer to pivot the protective strip 12 out of the way for easy access to the mounting surface 32, and then to affix the mounting strip to the substrate using either a staple gun, screws (screws 50 are shown in FIG. 4), or any other acceptable means for attachment.

It will be noted that mounting strip 14 includes longitudinally-extending rib 36 located adjacent hinged connector 16 and projecting inwardly, i.e., away from the substrate. As shown in FIG. 2, rib 36 is positioned so that, when the protective strip portion is in a closed position, the upper end of the rib 36 is closely adjacent to or engages, and thus may give interior support to, the protective strip portion 12 of the railing 10 adjacent the hinged connector portion 16.

The resilient protective strip 12 may be of any desired shape but is preferably a semi-cylindrical main body 18. One longitudinal edge of main body 18 terminates at hinged connector 16. A securing portion 20 is provided along the other longitudinal edge, and a plurality of longitudinally-extending support ribs 28 located on the inside surface of the main body. Similar to rib 36 on mounting strip 14, ribs 28 project (when the railing is in its closed position) towards the adjacent or facing surface of mounting strip 14; and in some embodiments the end of each rib engages the facing surface.

The dimensions and number of supporting ribs 28 and 36 will vary depending upon the particular application of the protective bumper rail. As will be apparent, the support ribs 28 and 36 are arranged at least partially to bridge the interior gap between the inside of mounting strip 14 and the inside of protective strip 12, and thus to maintain the integrity of the outer surface of the protective strip by preventing the strip from collapsing when it is impacted by a point source, such as by a shopping cart or a hospital gurney. The ribbed design also aids in absorbing impact forces by distributing impact forces longitudinally down the bumper, and in maintaining the integrity of the outer surface of the protective strip in radiused applications by preventing the flattening of the resilient protective strip when used in curved surfaces. It will be understood that certain curved surface applications will require a resilient protective bumper rail having greater internal support than others. For example, the greater the overall width of the protective bumper, the more support ribs may be needed to maintain the external integrity of the bumper rail.

Referring now to FIGS. 1 and 3, securing portion 20 of protective strip 10 includes a resilient hook 22 at one end thereof, a resilient sealing rib 24 at the connection between securing portion 20 and main body 18, and a substantially planar surface 26 which extends from hook 22 to sealing rib 24.

As shown in FIGS. 2 and 4, it will be seen that when the mounting strip 14 and resilient protective strip 12 are pivoted into their relatively closed position, the hook 22 of securing portion 20 engages hook 30 of mounting strip 32 and securely locks the two strips together. When the strips are locked together, sealing rib 36 of protective strip 12 is compressed against the surface to which the protective bumper railing is being affixed, e.g., wall 41, and prevents dirt, crumbs and the like from passing between the rib and the wall. At the same time, sealing rib 36 creates a seal with the surface to be protected along the other edge of the railing assembly 10. Thus, the two sealing ribs 28 and 36 together prevent dirt or any other particles from lodging between the protective bumper rail and the substrate and provide a "sanitary" locking system.

The embodiment of FIG. 1 includes an insert 38 coextruded with mounting member 14. Insert 38 is made of a material which is stiffer than the material which makes up the remainder of the protective railing and thus prevents shrinking and stretching. Such inserts are not required in all applications, but may be included when additional rigidity and/or enhanced aesthetics are required or desired.

Figure 5:
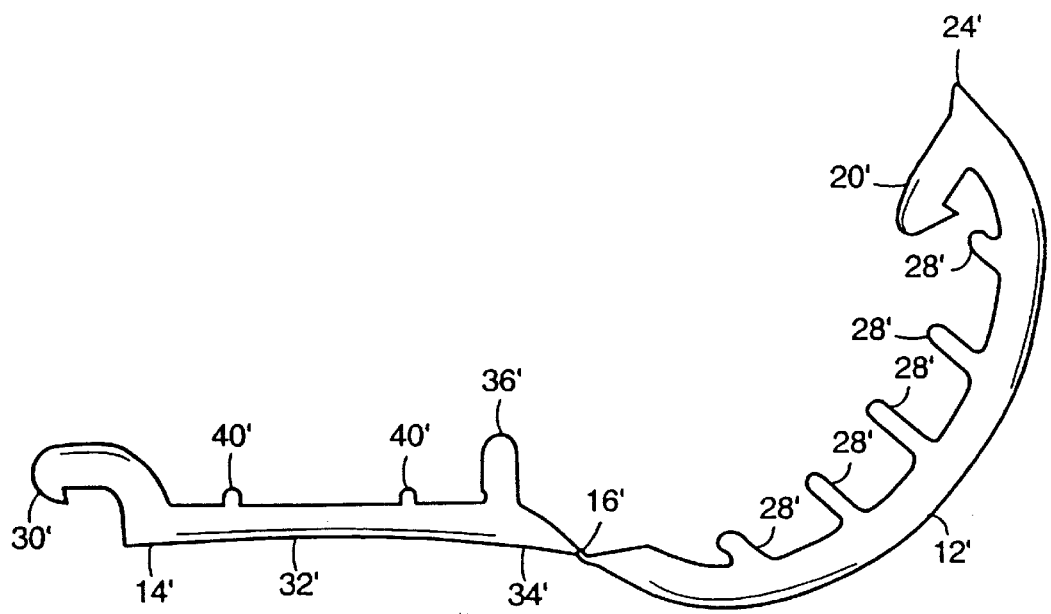
FIG. 5 is a sectional view of a second preferred embodiment of the present invention in an open position.

FIG. 5 shows another railing, generally designated 10', constructed in accord with the present invention. As shown, railing 10' does not include a stiffening insert. Rather, railing 10' is coextruded from different plastic materials such that protective strip 12' and hinge 16' are formed from a resilient, flexible material, while mounting strip 14' is formed from a relatively rigid PVC plastic material. As shown, a pair of upstanding reinforcing ribs 40' are provided on the interior surface of the central portion 32' of mounting strip 14'. Ribs 40', together with the natural strength of the PVC material forming mounting strip 14', provide the necessary rigidity, and resistance to shrinkage and stretching.

It will be appreciated that, in both railing 10 and railing 10', the protective strip 14, 14', by virtue of either its own rigidity or that of an added insert, provides that the protective strip is relatively more rigid and resistant to changes in shape than is the resilient protective strip 12, 12'.

The precise material and process desirable in any particular end use will depend on a number of variables, including but not limited to the expected conditions of use and the budget of the customer. Either the addition of inserts or the use of a rigid mounting strip makes the protective bumper rail more resistant to both shrinkage and stretching and improves the appearance of the edge profile of the rail by creating a straight outer edge without any waves.

Additional features of the invention will be appreciated by those skilled in the art. The protective bumper rail may be advantageously used along walls and corridors to protect the exposed surfaces from impact due to moving carriages, round display islands and around the ends of display cases throughout department and grocery stores. The protective bumper rail of the invention can be coiled in long runs, yielding aesthetically pleasing uninterrupted run of material without visual breaks.

The foregoing description should be taken as illustrative and not limiting in any sense. Other embodiments of the invention will occur to those skilled in the art and are within the scope of the following claims.

What is claimed is:

1. A method for making a protective bumper rail for protecting a substrate, the method comprising coextruding a unitary bumper rail having a longitudinally-extending mounting strip with a substantially planar mounting surface and a resilient longitudinally-extending protective strip, the mounting strip and the protective strip hinged along a pair of adjacent longitudinally-extending sides thereof for permitting pivotal movement of the protective strip relative to the mounting strip between a first position in which the protective strip overlies the mounting strip and a second position in which the protective strip is pivoted away from the mounting strip, the mounting strip being made of a material different from that used to form the protective strip, the material for the protective strip being more flexible than the material used for the mounting strip, wherein one of the mounting strip and the protective strip has a longitudinally-extending support rib extending inwardly toward the other of the mounting strip and the protective strip when in the first position.

2. The method of claim 1, wherein the coextruding includes extruding a mounting strip made of PVC plastic.

3. The method of claim 1, wherein the protective strip has the longitudinally-extending support rib extending inwardly toward the mounting strip.

4. The method of claim 1, wherein the mounting strip has the longitudinally-extending support rib extending inwardly toward the protective strip.

5. The method of claim 1, wherein the coextruding includes coextruding a mounting strip made of a material that is more resistant to stretching and shrinkage than the material used for the protective strip.

6. The method of claim 5, wherein the mounting strip is coextruded of a rigid PVC organic plastic material.

7. The method of claim 1, wherein one of the mounting strip and protective strip has a hook and the other of the mounting strips and protective strips has a latch.

8. The method of claim 7, wherein the latch is on the protective strip.

9. The method of claim 1, wherein the mounting strip can fit flush against a surface, and the protective strip has an arcuate shape that covers the mounting strip when in the first position.

10. The method of claim 1, wherein each of the protective strip and the mounting strip has a rib extending toward the other of the mounting strip and the protective strip in the first position.

11. The method of claim 1, further comprising coextruding in insert against the mounting strip and stiffer than the rest of the mounting strip.

12. The method of claim 1, wherein the mounting strip is coextruded with a concave shape on a side for facing a wall on which the mounting strip is to be mounted.

13. A method for making a protective bumper rail for protecting a substrate, the method comprising coextruding a unitary bumper rail having a longitudinally-extending mounting strip with a substantially planar mounting surface and a resilient longitudinally-extending protective strip, the mounting strip and the protective strip hinged along a pair of adjacent longitudinally-extending sides thereof for permitting pivotal movement of the protective strip relative to the mounting strip between a first position in which the protective strip overlies the mounting strip and a second position in which the protective strip is pivoted away from the mounting strip, the mounting strip being made of a material different from that used to form the protective strip, the material for the protective strip being more flexible than the material used for the mounting strip, wherein one of the protective strip and the mounting strip has a longitudinally-extending sealing rib extending toward and contacting the other of the protective strip and mounting strip when in the first position.

14. The method of claim 13, wherein the sealing rib extends from the mounting strip to the protective strip.

15. A method comprising:
    coextruding a unitary protective bumper rail having:
    a longitudinally-extending mounting strip made of a first material and a longitudinally-extending protective strip made of a second material different from the first material;
    the mounting strip and the protective strip being hingeably connected along a pair of adjacent longitudinally-extending sides thereof for permitting pivotal movement of the protective strip relative to the mounting strip between a first position in which the protective strip overlies the mounting strip, and a second position in which the protective strip is pivoted away from the mounting strip;
    one of the mounting strip and the protective strip including a latch mounted along the longitudinally-extending side thereof opposite the side thereof that is hingedly connected to the other of the mounting strip and the protective strip, and the other of the mounting strip and the protective strip including a connector mounted along the longitudinally-extending side thereof opposite the side thereof that is hingedly connected to the other of the mounting strip and the protective strip, the latch and the connector being arranged to engage each other when the protective strip and the mounting strip are in the first position, wherein one of the protective strip and the mounting strip has a longitudinally-extending support rib extending inwardly toward the other of the protective strip and the mounting strip.

16. The method of claim 15, wherein the mounting strip has the longitudinally-extending support rib extending inwardly toward the protective strip.

17. The method of claim 15, wherein the protective strip has the longitudinally-extending support rib extending inwardly toward the mounting strip.

18. A method comprising:

coextruding a unitary protective bumper rail having:

a longitudinally-extending mounting strip made of a first material;

a longitudinally-extending protective strip made of a second material different from the first material;

the mounting strip and the protective strip being hingeably connected along a pair of adjacent longitudinally-extending sides thereof for permitting pivotal movement of the protective strip relative to the mounting strip between a first position in which the protective strip overlies the mounting strip, and a second position in which the protective strip is pivoted away from the mounting strip, one of the mounting strip and the protective strip including a latch mounted along the longitudinally-extending side thereof opposite the side thereof that is hingedly connected to the other of the mounting strip and the protective strip, and the other of the mounting strip and the protective strip including a connector mounted along the longitudinally-extending side thereof opposite the side thereof that is hingedly connected to the other of the mounting strip and the protective strip, the latch and the connector being arranged to engage each other when the protective strip and the mounting strip are in the first position, wherein the coextruding includes coextruding a sealing rib on one of the mounting strip and the protective strip and extending to and contacting the other of the mounting strip and the protective strip when in the first position.

19. A method for making a protective bumper rail for protecting a substrate, the method comprising coextruding a unitary bumper rail having a longitudinally-extending mounting strip with a substantially planar mounting surface and a resilient longitudinally-extending protective strip, the mounting strip and the protective strip hinged along a pair of adjacent longitudinally-extending sides thereof for permitting pivotal movement of the protective strip relative to the mounting strip between a first position in which the protective strip overlies the mounting strip and a second position in which the protective strip is pivoted away from the mounting strip, the mounting strip being made of a material different from that used to form the protective strip, such that one is more flexible than the other, wherein the mounting strip and protective strip each have monolithic members for latching together when in the first position, wherein, in the first position, a hinge is at one end of the bumper rail and the latching members are at another end of the bumper rail.

20. The method of claim 19, wherein the mounting strip can fit flush against a surface, and the protective strip has an arcuate shape that covers the mounting strip when in the first position.

21. The method of claim 19, further comprising coextruding in insert against the mounting strip and stiffer than the rest of the mounting strip.

22. The method of claim 19, wherein the mounting strip is coextruded with a concave shape on a side for facing a wall on which the mounting strip is to be mounted.

23. A method for making a protective bumper rail for protecting a substrate, the method comprising coextruding a unitary bumper rail having a longitudinally-extending mounting strip with a substantially planar mounting surface and a resilient longitudinally-extending protective strip, the mounting strip and the protective strip hinged along a pair of adjacent longitudinally-extending sides thereof for permitting pivotal movement of the protective strip relative to the mounting strip between a first position in which the protective strip overlies the mounting strip and a second position in which the protective strip is pivoted away from the mounting strip, the mounting strip being made of a material different from that used to form the protective strip, the material for the protective strip being more flexible than the material used for the mounting strip, wherein the mounting strip can fit flush against a surface, and the protective strip has an arcuate shape and covers the mounting strip.

24. The method of claim 23, wherein the mounting strip is coextruded with a concave shape on a side for facing a wall on which the mounting strip is to be mounted.

* * * * *